Jan. 5, 1932.　　　　　E. W. MILLER　　　　　1,839,693
REVOLUBLE TRUING MEANS FOR HELICOIDAL SURFACES
Filed Sept. 17, 1929　　4 Sheets-Sheet 1

Inventor
Edward W. Miller

Jan. 5, 1932.   E. W. MILLER   1,839,693
REVOLUBLE TRUING MEANS FOR HELICOIDAL SURFACES
Filed Sept. 17, 1929   4 Sheets-Sheet 2

Inventor
Edward W. Miller

Jan. 5, 1932.  E. W. MILLER  1,839,693
REVOLUBLE TRUING MEANS FOR HELICOIDAL SURFACES
Filed Sept. 17, 1929  4 Sheets-Sheet 3
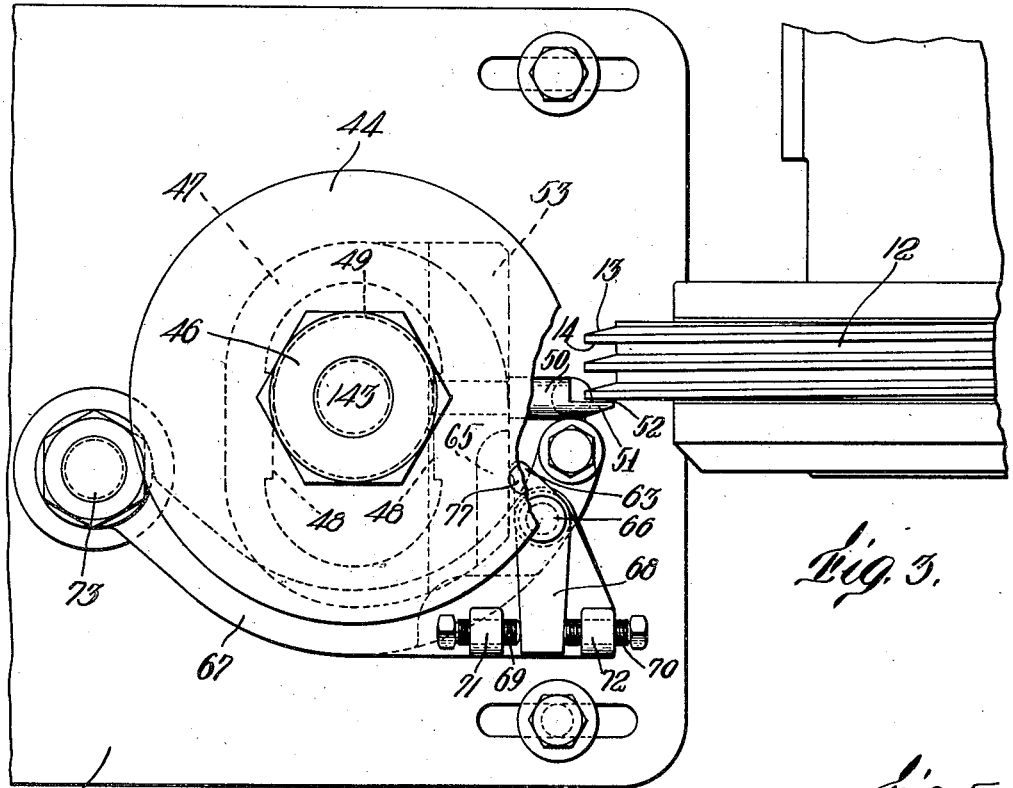
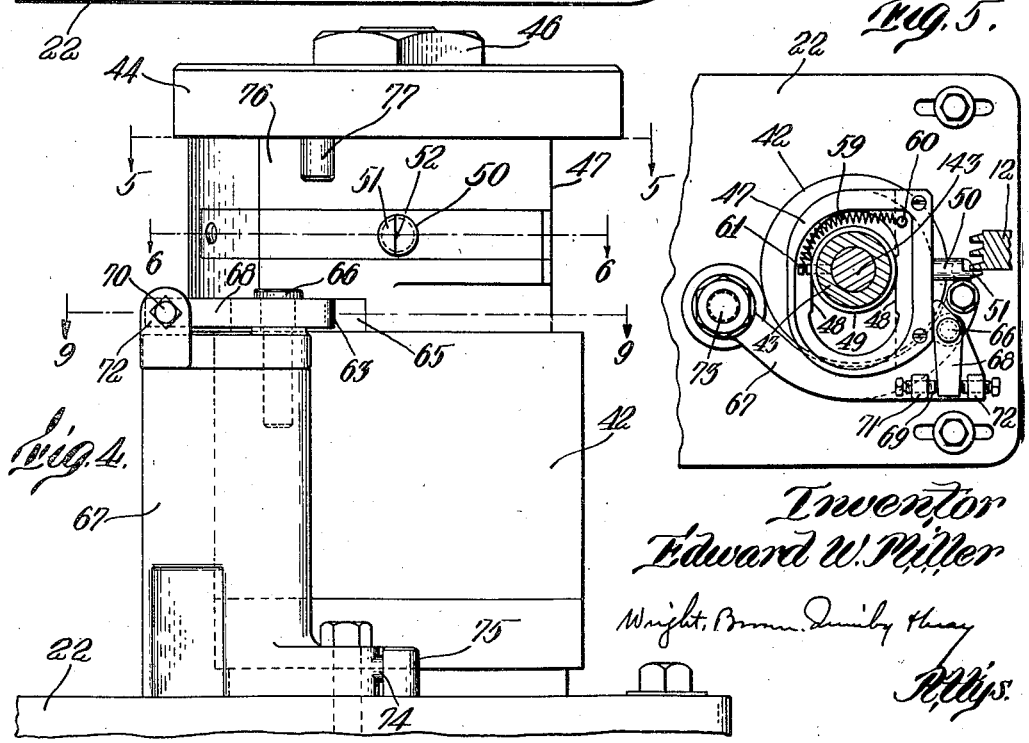
Inventor
Edward W. Miller

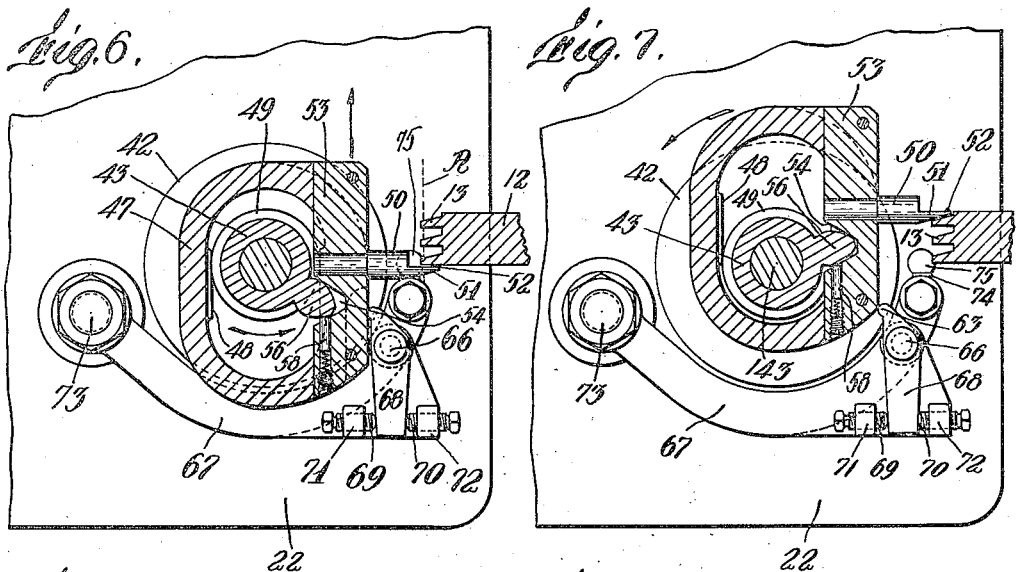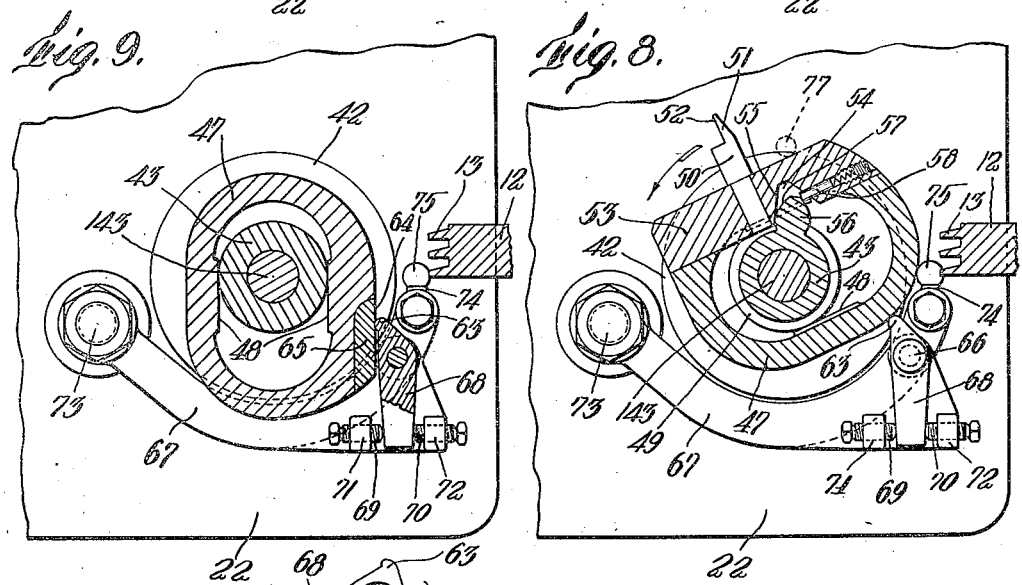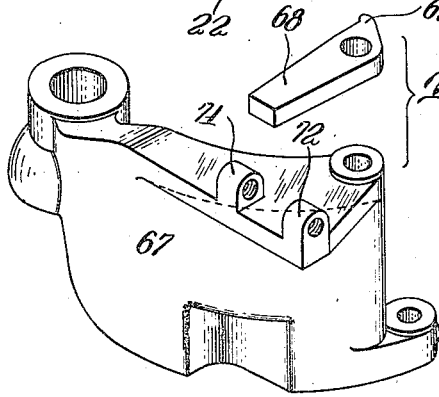

Patented Jan. 5, 1932

1,839,693

UNITED STATES PATENT OFFICE

EDWARD W. MILLER, OF SPRINGFIELD, VERMONT, ASSIGNOR TO THE FELLOWS GEAR SHAPER COMPANY, OF SPRINGFIELD, VERMONT, A CORPORATION OF VERMONT

REVOLUBLE TRUING MEANS FOR HELICOIDAL SURFACES

Application filed September 17, 1929. Serial No. 393,292.

This invention relates to means for bringing into true and accurate form, and good cutting condition, a helicoidal surface on an abrasive tool adapted to cut the teeth of involute gears and gear shaping cutters to finished size and form with generation of their face curves. Such tools are intended and designed to perform very accurate work in finishing the tooth faces of the gears, etc. on which they act, and to that end must themselves be extremely accurate. The provision of means for obtaining such accuracy is one of the major problems which I have encountered in developing machines for finishing gears and the like with the aid of a helicoidal cutting tool, and one which I have solved in various ways. The truing means or mechanism disclosed in the present specification embodies one of my solutions of this problem. It comprises a truing tool and the carrier therefor, together with a rotatable driver for such carrier, and a stationary guide, so organized that during the rotation of the driver the truing tool is first advanced rectilinearly simultaneously with the axial progression of the helicoidal surface being trued, and after traversing the cutting tool, is revolved in an orbit which brings it again to starting position. With these means are combined a feed for bringing the truing tool successively into paths more or less distant from the axis of the cutting tool, and means for adjusting the rate of traverse of the truing tool along the cutting tool so as to correct the helical pitch or lead of the latter tool. The specific device here shown for illustration of the invention is designed to true the helicoidal face of an abrading wheel and is constructed as an attachment adapted to be applied to a gear grinding machine and to be driven by the work holding spindle thereof; but in its broader aspects and within the scope of my broader claims the invention is not thus limited, but includes the application of the novel principles here embodied for truing and sharpening any type of helical cutter in combination with any suitable supporting and driving means.

Referring to the drawings in which this embodiment is illustrated,—

Fig. 1a is a fragmentary view showing part of the work spindle of the machine carrying a gear in operative relation to the abrading wheel;

Fig. 3 is a plan view on a larger scale of the wheel truing attachment and a part of the abrading wheel in operative relationship;

Fig. 4 is an elevation of the truing attachment;

Fig. 5 is a cross section on line 5—5 of Fig. 4;

Figs. 6, 7 and 8 show a horizontal section on line 6—6 of Fig. 4 and illustrate the truing device in different positions;

Fig. 9 is a section on line 9—9 of Fig. 4;

Fig. 10 is a perspective view showing one of the elements of the machine.

Like reference characters designate the same parts wherever they occur in all the figures.

Figure 1:
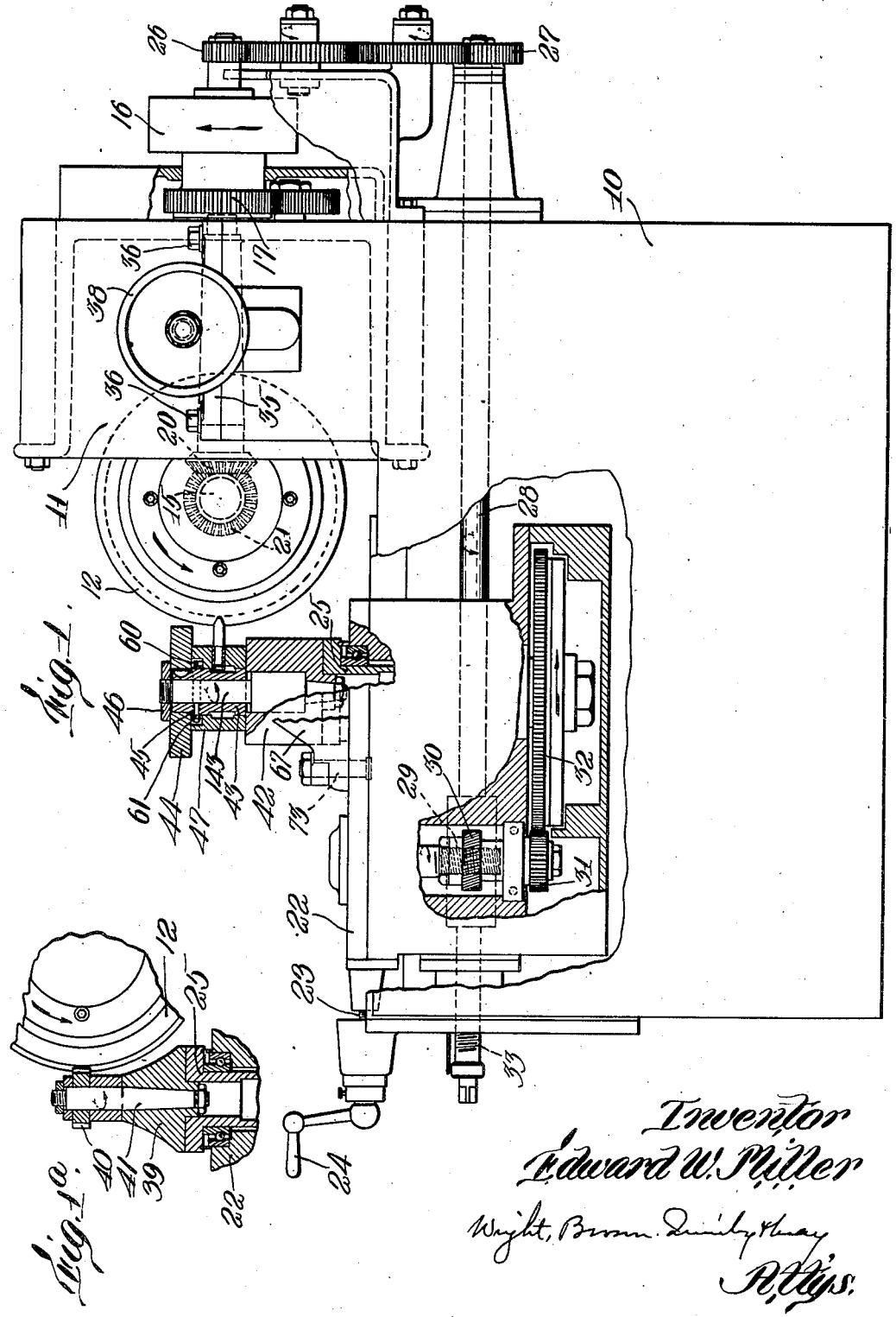
Fig. 1 shows a side elevation, with parts broken away and shown in section, a gear grinding machine employing a helicoidal abrading wheel and having the wheel truing device of the present invention applied thereto as an attachment.
Figure 2:
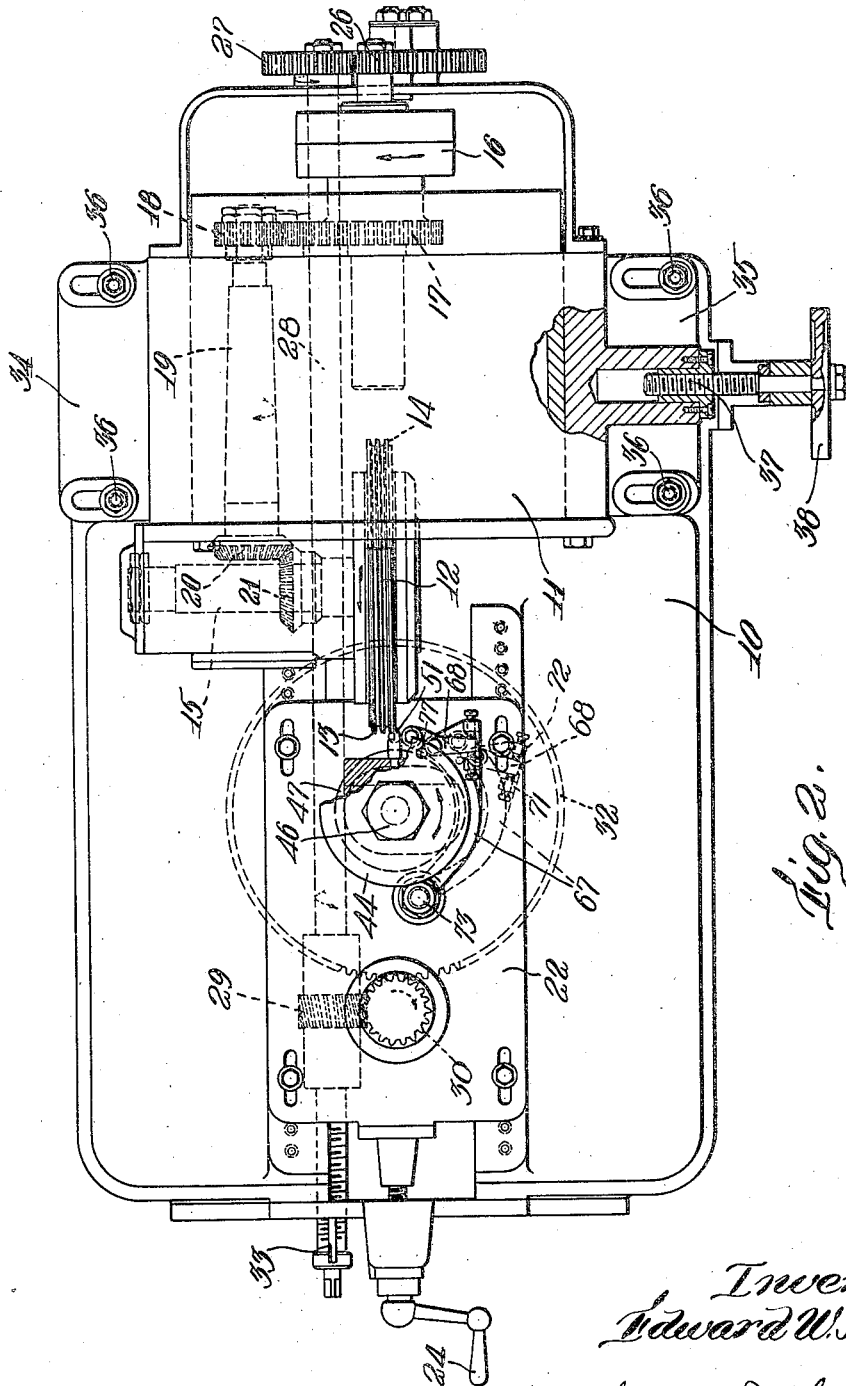
Fig. 2 is a plan view of the machine.

10 represents the base of the machine on which there are rising parts supporting a head 11 carrying the gear generating tool 12, which in this instance is an emery wheel having a helical rib 13, shown best in Fig. 3, the face 14 of which is the active abrading face and forms a helicoidal surface of which the radial elements are perpendicular to the axis. This tool is mounted on a spindle 15 and is driven at the desired grinding speed by any suitable means, such as a belt pulley 16 acting through a gear train 17—18, shaft 19 and bevel gear couple 20—21.

The base supports a work carriage 22 which is adjustable toward and away from the axis of the wheel by means of a screw 23 having an operating crank 24. In the carriage is a work spindle 25 driven from pulley 16 through a gear train 26—27, shaft 28, helical gear couple 29—30, pinion 31 and gear 32. A screw 33 serves to adjust the helical gear 29 endwise on shaft 28 (to which it is splined) whereby to give an angular adjustment to the work spindle. Head 11 is adjustable lengthwise of the grinding wheel axis, being provided with slotted lugs 34 and 35 at opposite sides, through which attaching bolts 36 pass into the subjacent rising parts of the base, and being moved by a screw 37 on which is a hand wheel 38.

In the operation of the machine for grinding, a work holder 39 (Fig. 1a) is secured to the spindle 25 and rotated by the foregoing means at a rate such that the work piece 40, secured to the arbor 41 in the holder 39, turns with the same linear velocity at its base circle as the displacement or progression of the helicoidal grinding surface axially of the grinding wheel.

When the grinding wheel requires to be dressed and trued, the work holder 39 is removed and the truing attachment substituted therefor. Said attachment comprises a supporting base or holder 42 which is secured by any suitable means rigidly to the spindle 25, and by which the movable parts of the truing mechanism are carried. An arbor 143 coaxial with the spindle rises from the base 42, and a sleeve 43 is fitted thereon; said sleeve having a flange on its lower end which overlaps the top of the base 42. A disk 44, or equivalent holder for a stop pin later described, is fitted and keyed on the upper end of the sleeve 43, resting on a shoulder 45 of the latter, and is overlapped and pressed upon by a clamp nut 46 screwed on to the protruding end of the arbor. The clamp nut crowds the sleeve 43 tightly against the base, causing it to rotate with the arbor, and not otherwise. A truing tool carrier 47 surrounds the sleeve 43 and is fitted between the upper surface of the base 42 and under surface of disk 44 with freedom for independent movement. The interior opening of this carrier, in which sleeve 43 is contained, is substantially wider than the outside diameter of the sleeve, by an amount at least as great as, and preferably somewhat greater than, the entire axial length of the grinding wheel, as shown in Figs. 5–9. Parallel interior guideways 48 are formed in the holder to engage flanges 49 on sleeve 43 and are fitted to the latter so as to permit free sliding movement of the carrier without substantial play or looseness. A shank or holder 50 having a projecting finger 51 in the side of which a diamond 52 or other suitable truing tool is set, is mounted in the holder so as to protrude from one side thereof, as plainly shown in the drawings.

The part of the carrier which directly holds the truing tool shank is a bar or plate 53 set into a slot in one side of the carrier and secured therein, and having in its inner side a notch 54 formed with an inclined plane surface 55 at one side, which corresponds to the face of a rack tooth. This notch is so positioned that it may be entered by a cam projection 56 protruding from the side of sleeve 43 and having an involute curved face 57 adapted to cooperate with the plane surface 55 in the manner of a gear tooth with a rack tooth. A spring pressed plunger 58 is mounted in the bar 53 and arranged to press on the opposite side of the cam projection 56 so as to keep the surfaces 55 and 57 always in contact. A spring 59 (Fig. 5) is connected to the carrier 47 and sleeve 43. The function of this spring is to permit independent rotation of the sleeve with respect to the carrier and to cause the latter to follow the sleeve when released from the restraint of the controller presently described. As here shown it is a helical spring anchored at one end to a pin 60 on the carrier, and extending thence part way around the sleeve 43, to connection with a pin 61 protruding from the side of the sleeve.

The controller above mentioned is formed by the extremity of a dog or finger 63 supported by the carriage independently of the before described movable parts and adapted to engage the side of carrier 47. The part of the carrier which it engages is the straight outer surface 64 (Fig. 9) of a wear plate 65 set into the outer side of the carrier parallel to the guideways 48, and at the same side as the truing tool.

The arrangement of the parts of the above described mechanism is such that, when the truing tool is brought into position to begin action on the grinding wheel, shown in Figs. 3, 5 and 6, the rotation directions of the grinding wheel and work spindle being as indicated by arrows, the surface 64 is in contact with the controller 63 and is in a line parallel to the line of action of the grinding wheel, and the projection or tooth 56 is engaged with the rack tooth face 55 in the manner necessary to propel the same, in the direction of the arrow in Fig. 6, along a pitch line parallel to surface 64. By "line of action" in the foregoing explanation I mean the straight line in an axial plane of the grinding wheel which passes through the points in successive turns of the helical grinding surface at which contact is made with the work. In the present illustration such line of action is parallel to the grinding wheel axis and is represented by the broken line A in Fig. 6.

As a matter of convenience and to permit of being adjusted and moved out of the way when not needed, the controller 63 is connected by a pivot pin 66 with a holder or carrier 67, and is provided with an arm 68 extending between opposed adjusting screws 69, 70 in lugs 71, 72 on the holder. The holder in turn is mounted on a pivot stud 73 rising from the carriage 22, and is adapted to be placed with a lug 74 on its extremity in contact with a stop 75, also set in the top of the carriage.

Operation:—The grinding wheel and work spindle rotate continuously at the proper ratio. When, in the course of its rotation, the work spindle brings the truing tool carrier into the position shown in Figs. 3, 5, 6 and 9, the carrier engages its controller 63, whereby it is withheld from further rotation. The projection 56 then acts as a gear tooth to propel the carrier, as a rack, in a straight path parallel to the line of action of the grinding wheel, to which it is constrained by the controller, the guide surface 64, and the guideways 48. In so moving, the truing diamond follows the axial displacement of the helicoidal face of the grinding wheel, and dresses a zone of such face. Proper engagement of the grinding wheel face with the truing tool may be effected by the tool head adjusting screw 37. When the diamond has traversed the entire axial length of the grinding wheel it is approximately in the position shown in Fig. 7, and then the end of the guide face 64 passes clear of the controller 63. The carrier 47, being then free from restraint, is revolved by the spring 59 until its external flat surface adjacent to the angle 76 (Fig. 4) brings up against a stop pin 77 which projects downward from the disk or holder 44. This movement brings the carrier into the position shown in Fig. 8, and restores the originally existing relationship between the rack tooth face 55 and the gear tooth face 57 shown in Fig. 6. The balance of rotation of the work spindle then brings the truing tool up to the grinding wheel again in the position shown in Fig. 6, and another traverse of the tool over the wheel face is made. A feed movement given to the carriage 22 in the meantime enables the following traverse of the truing tool to be made in a path beside that of the preceding one, so that it then dresses a contiguous zone of the helicoidal surface. In this way, by starting at the outer circumference of the grinding wheel helix, and progressively feeding the work carriage toward the axis of the grinding wheel, or vice versa, the entire helicoidal face may be dressed and trued. If the work spindle is geared in harmony with the wheel the truing tool travels in harmony with the wheel and thus forms the correct lead of the helix.

If for any reason it is found that the pitch or lead of the helix is not exactly what is desired and results in producing too great a pressure angle in the gear next to be ground, such error may be corrected by adjusting the controller by means of the screws 69 and 70. Shifting the controller to either side of the position shown in the drawings causes the truing tool to travel at a slight inclination to the line of action, instead of parallel thereto, thus shortening the pitch (or decreasing the lead) of the helix. In order to correct unavoidable errors in either direction, those due to too small as well as too great a lead and pitch of the helix, the face 57 of the tooth projection 56 is preferably ground as an involute of a base cylinder somewhat larger than that indicated mathematically as correct for the purpose. A very slight adjustment is sufficient to correct the slight inaccuracies which may conceivably be found in a machine of this character; and indeed the provision for adjustment is more a precaution than an absolute necessity. However, it enables the machine to function with virtually absolute accuracy.

The reason for mounting the controller 63 on the shiftable holder 67 is to enable it to be readily swung out of the way in substituting the truing mechanism for the work holder and vice versa. Such substitution may thus be very easily and quickly made.

It will be seen that the substitution of the truing mechanism for the work holder converts the machine from a grinding machine to a wheel truing machine; and it will be obvious that the principles of this invention may be applied to one which is primarily and exclusively a truing machine to which the grinding wheel may be taken from the grinding machine in which it is normally used. It will be evident also that the principles of this invention may be embodied in equivalent although specifically different forms and environments. It is to be remembered also that the use and application of the invention are not necessarily limited to an abrasive wheel strictly so-called, but may be adapted to the purpose of truing a lap, sharpening a metallic edged cutter, etc., provided in any case the object operated on has a helical formation.

What I claim and desire to secure by Letters Patent is:

1. A truing means for a helical cutting tool comprising a truing element, a carrier therefor, a rotatable driver for said carrier with respect to which the latter is independently movable translatively and revolubly, a controller for said carrier arranged to withhold the same from rotation while said driver rotates, a spring connecting the carrier and driver arranged to be put under tension while the carrier is so withheld, and means for shifting the foregoing mechanism toward and away from the axis of the cutting tool.

2. A means for truing a helicoidal cutting tool comprising means for supporting and rotating said tool, a rotatable spindle supported with its axis transverse to and at one side of the axis of the cutting tool, a truing tool carrier having parallel guides embracing said spindle and adapted to slide linearly transversely thereto and having an external guiding portion parallel to said guides, said carrier being supported by the spindle and adapted to rotate therewith as well as to be movable translatively with respect thereto, gear and rack tooth elements on the spindle and carrier intermeshing on a pitch line parallel to said external guiding surface, a stationary controller for the carrier arranged in the path of said external surface to be engaged by the latter when said surface is adjacent to and beside the cutting tool, a truing tool carried by said carrier in position to engage the helicoidal surface of the cutting tool while the said external surface is in contact with said controller, and yieldable means connected with the spindle and carrier tending to cause the carrier to rotate with the spindle and adapted to yield when the carrier is restrained from rotation by said controller.

3. Truing means for a helicoidal cutting tool comprising a rotatable holder for the cutting tool, a truing element for the cutting tool, a carrier for said truing element, and means for moving said truing tool in a closed circuit with a succession of separate movements of rotation and translation, all in a plane substantially parallel to the axis of said cutting tool, the translative portion of the movement of said truing tool being located in intersection with the helicoid of the cutting tool.

4. Means for truing a helicoidal surface in a cutting tool comprising a rotatable holder for such tool by which the tool is rotated about the axis of the helicoid, a truing tool, means for carrying said truing tool in an orbit which includes a rectilinear portion intersecting the helicoid and a circular portion from the end back to the starting point of such rectilinear portion, and means for moving the truing tool toward and away from the rotational axis of the cutting tool.

5. A truing mechanism for a cutting tool having a helicoidal surface comprising means for holding said cutting tool and rotating it about the axis of its helicoidal face, a truing tool, a carrier for said truing tool adapted to transport the lateral in an orbit such that the truing tool travels rectilinearly with the axial progression of the helicoidal face and then revolubly to the starting point, and means for changing the distance between the truing tool and the axis of the cutting tool so that successive traverses of the truing tool over the helicoidal face occur in paths side by side.

6. A truing mechanism for a cutting tool having a helicoidal surface comprising means for holding said cutting tool and rotating it about the axis of its helicoidal face, a truing tool, a carrier for said truing tool adapted to transport the latter in an orbit such that the truing tool travels rectilinearly with the axial progression of the helicoidal face and then revolubly to the starting point, means for changing the distance between the truing tool and the axis of the cutting tool so that successive traverses of the truing tool over the helicoidal face occur in paths side by side, and means for altering the inclination to the cutting tool axis of the rectilinear part of the truing tool orbit.

7. A means for dressing a helicoidal face on a cutting tool comprising in combination a means for supporting such cutting tool and rotating it about the axis of the helicoidal surface, a rotatable spindle mounted at one side of the cutting tool with its axis transverse to the axis of said tool, a cam carried by said spindle and formed on one side as a tooth of a gear having its pitch circle concentric with said spindle, a carrier having an abutting surface engaged with said cam face in the manner of a rack tooth, a truing tool carried by said carrier at a distance from the spindle and on the same side of a diameter of the spindle as the cam, the carrier being supported by and rotatable with the spindle and having freedom for rectilinear relative movement transversely to the axis of the spindle, yieldable means tending to cause rotation of the carrier with the spindle, and stationary means for temporarily arresting rotation of the carrier when the truing tool is traversing that part of its orbit which lies next to the cutting tool.

8. A helicoid dressing means as set forth in claim 7, in which the carrier arresting means comprises a stationary controller and a guiding surface on the truing tool carrier arranged to make contact with said controller and slide past the same during the travel of the carrier.

9. A truing mechanism as set forth in claim 7 in which the rotation arresting means for the carrier comprises a straight guiding surface on the carrier and a stationary controller arranged to be engaged by said guiding surface when the truing tool approaches near to the cutting tool, and to be left by said guiding surface after the truing tool has traversed the axial length of the cutting tool.

10. A helicoid dressing means as set forth in claim 7, in which the carrier arresting means comprises a stationary controller and a guiding surface on the truing tool carrier arranged to make contact with said controller and slide past the same during the travel of the carrier, combined with means for shifting said controller so as to cause a change in the direction of the linear traverse caused by the engagement of said controller with said guiding surface.

11. An attachment for a gear grinding machine adapted to true the active face of a helicoidal grinding wheel comprising a holder adapted to be secured to the spindle of said machine, a sleeve secured to said holder having a gear tooth element projecting laterally therefrom, a truing tool carrier embracing said sleeve and being independently movable translatively and revolubly with respect thereto, having a rack tooth element in meshing engagement with said gear tooth element, a spring coupled to said sleeve and holder tending to cause rotation of the holder with the sleeve and permitting independent lateral translative movement of the holder while being put under increased stress by such movement, a diamond holder protruding from the side of said carrier, a truing diamond mounted at one side of the extremity of said holder, complemental stops for limiting independent rotation of the carrier under the influence of said spring, and a stationary controller stop engageable by a flat side of the carrier for arresting rotation of the carrier and causing the latter to be propelled translatively by the rack and pinion couple.

12. An attachment for a gear grinding machine adapted to true the active face of a helicoidal grinding wheel comprising a holder adapted to be secured to the spindle of said machine, a sleeve secured to said holder having a gear tooth element projecting laterally therefrom, a truing tool carrier embracing said sleeve and being independently movable translatively and revolubly with respect thereto, having a rack tooth element in meshing engagement with said gear tooth element, a spring coupled to said sleeve and holder tending to cause rotation of the holder with the sleeve and permitting independent lateral translative movement of the holder while being put under increased stress by such movement, a diamond holder protruding from the side of said carrier, a truing diamond mounted at one side of the extremity of said holder, complemental stops for limiting independent rotation of the carrier under the influence of said spring, a stationary controller stop engageable by a flat side of the carrier for arresting rotation of the carrier and causing the latter to be propelled translatively by the rack and pinion couple, and a displaceable holder for said controller stop mounted on the work carriage of the machine and adaptd to be moved out of the way of said attachment.

In testimony whereof I have affixed my signature.

EDWARD W. MILLER.